Nov. 8, 1966 H. LERMAN 3,284,620

INTEGRATOR

Filed March 21, 1962

HAROLD LERMAN
INVENTOR.

BY S.A. Giarratana
George B. Oujevolk

ATTORNEYS

United States Patent Office 3,284,620

Patented Nov. 8, 1966

3,284,620

INTEGRATOR

Harold Lerman, Paramus, N.J., assignor to General Precision Inc., Little Falls, N.J., a corporation of Delaware Filed Mar. 21, 1962, Ser. No. 181,324
3 Claims. (Cl. 235—183)

The present invention relates to an integrator arrangement, and, more particularly, to an integrator arrangement useful in missle guidance.

It is well known that in inertial navigation and missile guidance, integrators play a vital role. Thus, the displacement of a mass aboard a space vehicle or missile is a measure of acceleration, and the velocity of the missile is obtained by integration. Again, combining the velocity with time by integration, the distance traveled is calculated.

For long range navigation or guidance, complicated electronic or mechanical integrators are used, but, for a short range, it may be possible to use a conventional electronic amplifier. But, if a missile is to travel over about 300 seconds, this type of integrator cannot be used. As a result, there is a time range of somewhere over 300 seconds where an amplifier-type integrator cannot now be used except with very high gain amplifiers and the resulting complications in circuitry or by using integrator arrangements designed for a much longer time period. Athough attempts have been made to solve the foregoing difficulties by increasing the amplifier gain and trying to simplify the circuitry, none, as far as I am aware were successful when carried out into actual practice.

It has now been discovered that an arrangement is possible whereby the conventional amplifier type integrator may be used for an extended time period well over the present limit of about 300 seconds without any corresponding increase in amplifier gain being required.

Thus, an object of the present invention is to provide a long range, low cost small size integrator.

A further object of the present invention is to provide an electronic amplifier-type integrator having a much longer linearly increasing output than conventional electronic amplifier-type integrators.

Figure 1:
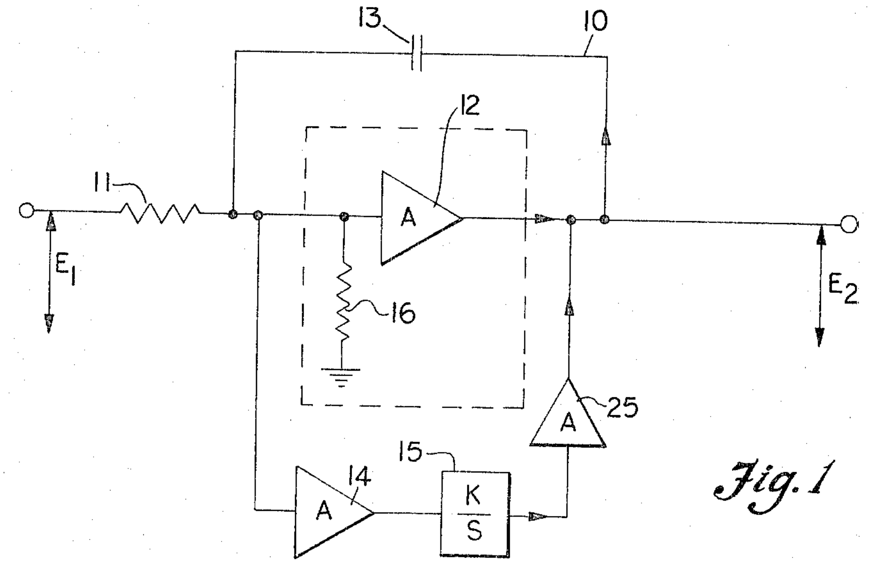
Figure 2:
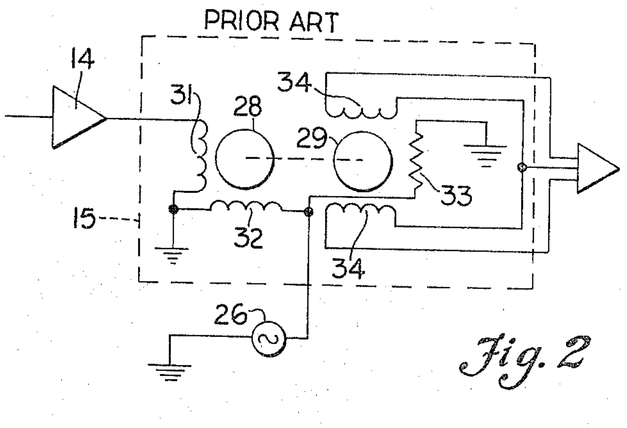

With the foregoing and other objects in view, the invention resides in the novel arrangement and combination of components and in the details of construction hereinafter described, it being understood that changes in the precise embodiment of the invention herein disclosed may be made within the scope of what is described without departing from the spirit of the invention. The advantages of the invention will become apparent from the following description taken in conjunction with the accompanying drawing, in which:

FIGURE 1 is a schematic and block diagram of the improved amplifier-type integrator contemplated herein; and FIGURE 2 illustrates schematically one of the components used herein.

Shown in the drawing is an integrator 10. The input $E_1$ of which is across a resistor 11 having a value R to an amplifier 12. A capacitor 13 is in parallel with amplifier 12 and together with resistor 11 performs the integration with time. From the amplifier input to ground there is an input resistance 16 of a value *r*. Ignoring for the moment the other components of integrator 10, the transfer function of these components in La Place transform notation is:

$$\frac{E_2(s)}{E_1(s)}=-\frac{\frac{A}{(1+A)}}{RCS+\frac{R+r}{r(1+A)}} \qquad (1)$$

where $E_1(s)$ is the input voltage $E_2(s)$ is the output voltage $A$ is the amplification factor If amplifier 12 had infinite gain, the equation would be $$\frac{E_2(s)}{E_1(s)}=-\frac{1}{RCS} \qquad (2)$$

This is the ideal transfer function of an integrator. Since the gain of the amplifier is not infinite, Equation 1 is the equation which applies in the present case. If the input frequency is high, Equation 1 may be considered as being $$\frac{E_2(s)}{E_1(s)}\approx-\left(\frac{A}{1+A}\right)\left(\frac{1}{RCS}\right) \qquad (3)$$

If the input frequency is low, Equation 1 becomes $$\frac{E_2(s)}{E_1(s)}\approx-\frac{Ar}{A+r} \qquad (4)$$

This is of course the proper equation for an amplifier instead of an integrator. Therefore, the components just described and which are used in a conventional amplifier-type integrator do not provide correct information for a long period of time. Thus, if there is a step input of voltage.

$$E_1(s)=V/s \qquad (5)$$

And if the integrator were an ideal integrator, the output voltage $E_2$ should be $$E_2(t)=-(Vt/RC) \qquad (6)$$

where $t$ represents time.

But for the components just described, the output voltage is:

$$E_2(t)=-\frac{VAr}{R+r}\left(1-e-\left[\frac{(R+r)t}{CRr(1+A)}\right]\right) \qquad (7)$$

By expanding the exponential into its series and considering the first three terms of the series, equation 7 can be simplified to $$E_2(t)=-\frac{Vt}{CR}\frac{A}{1+A}\left(1-\frac{(R+r)t}{2CRr(1+A)}\right) \qquad (8)$$

A comparison of Equations 8 and 6 indicate that the desired performance is subject to an error which increases as a function of time. From Equation 7, as time approaches infinity, the output voltage $E_2$ is $$E_2(t)=-(VAr/R+r) \qquad (9)$$

(where $t$ approaches infinity)

And, it is to be observed that this is substantially Equation 4.

To eliminate the foregoing disadvantage, a mechanical filter is added to the basic integrator just described. Generally speaking, this mechanical filter includes the combination of a low inertial torquer which can be an A.-C. or D.-C. servo motor, to produce a torque proportional to an input voltage or current; a transducer which can be an inductive, capacitive or Hall crystal pick-off to produce a voltage output proportional to a shaft displacement; and, a viscous damper which can be either fluid, magnetic, or mechanical. The viscous restraints should be made very high so that the effects of inertia are negligible. In fact, the mechanical filter itself acts like an integrator, but has no accuracy.

Thus, in parallel with amplifier integrator 12, there is a mechanical filter 15 connected in series to a preamplifier 14. Mechanical filter 15 is known in the art and has been described in detail in the D'Amico United States Patent No. 2,934,689. The mechanical filter generally includes a torque motor 28 and an induction generator to serve as a takeoff 29. Torque motor 28 is shown as having two windings 31 and 32, the winding 31 being a signal input winding, the winding 32 being a phase position or reference winding for a relatively fixed constant excitation. The signal takeoff 29 of filter 15 has an excitation winding 33 and an output signal winding 34 and functions as part of an amplifier transmission circuit. Windings 31 and 32 of torque motor 28 are so arranged as to enable the motor to operate as a two-phase motor so that the motor will operate only when the voltages supplied to windings 31 and 32 are ninety degrees out of phase with each other so as to prevent quadrature noise. This two-phase motor furthermore is subject to a heavy viscous damping. The mechanical filter 15 is also connected in series with a post amplifier stage 25.

If $A_1$ and $A_2$ are the gain of the pre and post amplifiers 14 and 25, and K is the steady state gain of the mechanical filter 15, by designating G as equal to $A_1KA_2$, the the transfer function of the entire unit is:

$$\frac{E_2(s)}{E_1(s)}=-\frac{SA+G}{CRS\left[(1+A)S+G+\frac{R+r}{CRr}\right]} \quad (10)$$

At high frequencies this equation becomes $$\frac{E_2(s)}{E_1(s)}\approx-\left(\frac{A}{1+A}\right)\left(\frac{1}{RCS}\right) \quad (11)$$

And, at low frequencies Equation 11 becomes $$\frac{E_2(s)}{E_1(s)}\approx-\left(\frac{G}{G+\frac{R+r}{CRr}}\right)\left(\frac{1}{RCS}\right) \quad (12)$$

Therefore, at high frequencies, the performance of the integrator is the same with or without the filter, but at low frequencies, the device still operates as an integrator except that the scale factor for the integrator is different. To make the scale factor equal, the following relationship must exist:

$$A=GC(Rr/R+r) \quad (13)$$

When this relationship exists, Equation 11 becomes $$\frac{E_2(s)}{E_1(s)}=-\left(\frac{1}{RCS}\right)\left(\frac{A}{1+A}\right) \quad (14)$$

Considering the operation of the device for a step input the equation corresponding to Equation 7 becomes $$E_2(t)=-\left(\frac{Vt}{CR}\right)\left(\frac{G}{G+\frac{R+r}{CRr}}\right)+ V_r\frac{[GCR_r-A(R+r)]}{(GCR_r+R+r)^2}\left[1-e-\left[\frac{GCR_r+R+r}{(1+A)CRr}\right]t\right] \quad (15)$$

Equation 15 is the same as Equation 7 except for the factor of G and this equation becomes Equation 7 when G equals zero. Comparison of Equations 7 and 15 indicate that Equation 15 has a term proportional to time. Thus, with the mechanical filter, the device always behaves as an integrator even when time becomes very large. The second term of Equation 15 is the error term. This error term reaches a steady value instead of increasing with time. If the situation described in Equation 13 is satisfied, the error term disappears. Rewriting Equation 15 with the exponential expanded into a series produces $$E_2(t)\approx-\frac{V}{1+A}\left\{1+\frac{\left[\frac{GCRr}{A}-(R+r)\right]t}{2CRr(1+A)}\right\} \quad (16)$$

Comparing Equation 16 with Equation 8 shows that as long as the value of G does not exceed twice the amount indicated in Equation 13 the error for the combination of the amplifier-integrator with a mechanical filter will be less than for the device without the filter. Equations 8 and 16 are good approximations for reasonable values of time. Therefore, in order to obtain satisfactory integration operation of an amplifier-integrator without a mechanical filter, for a long time range, the open loop gain of the amplifier must be extremely high, in the order of several million. With the combination of the amplifier and the mechanical filter, it is possible to use amplifiers having a much lower gain.

It is to be observed therefore that the present invention provides for an improvement in an integrator device 10 to integrate a changing value with time, which includes, a resistor 11, on the input side of the device; an amplifier 12, coupled in series to said resistor; and, a capacitor 13, in parallel with said amplifier. The improvement contemplates a feed forward loop having mechanical filter means 15 in parallel with the amplifier as well as with capacitor 13. The mechanical filter means 15 includes a viscous damped motor 28 and a takeoff 29 driven by the motor. The viscous damped motor 28 is preferably a two-phase motor in a quadrature noise supression arrangement 31 and 32, the takeoff being an A.-C. takeoff. The feed forward loop includes a preamplifier 14 and a post amplifier 25, both connected in series with mechanical filter means 15.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

I claim:

1. In a device to integrate a changing value with time, including a resistor on the input side of said device, an amplifier coupled in series to said resistor, and a capacitor in parallel with said amplifier, the improvement therein comprising the combination of mechanical filter means in a feed forward loop which is in parallel with said amplifier and capacitor.

2. A device as claimed in claim 1, said mechanical filter means including, a viscous damped motor, a take-off driven by said motor and being connected in series with a preamplifier and a post amplifier.

3. A device as claimed in claim 2, said viscous damped motor being a two-phase motor in quadrature noise suppression arrangement, said take-off being an A.-C. takeoff.

References Cited by the Examiner

UNITED STATES PATENTS

| | | | |
|---|---|---|---|
| 2,513,537 | 7/1950 | Williams | 235—183 X |
| 2,934,689 | 4/1960 | D'Amico | 318—328 |

MALCOLM A. MORRISON, *Primary Examiner.*

DARYL W. COOK, *Examiner.*

H. E. WURST, A. J. SARLI, *Assistant Examiners.*